(12) United States Patent
Sakurai

(10) Patent No.: US 8,441,726 B2
(45) Date of Patent: May 14, 2013

(54) OPTICALLY VARIABLE FILTER APPARATUS AND FILTER CHARACTERISTIC CONTROL METHOD THEREOF

(75) Inventor: Yasuki Sakurai, Aichi (JP)

(73) Assignee: Santec Corporation, Aichi Pref. (JP)

( * ) Notice: Subject to any disclaimer, the term of this patent is extended or adjusted under 35 U.S.C. 154(b) by 159 days.

(21) Appl. No.: 12/980,429

(22) Filed: Dec. 29, 2010

(65) Prior Publication Data

US 2012/0120475 A1 May 17, 2012

(30) Foreign Application Priority Data

Nov. 15, 2010 (JP) .................. 2010-254648

(51) Int. Cl.
G02B 27/46 (2006.01)
G02F 1/13 (2006.01)

(52) U.S. Cl.
USPC ........... 359/559; 359/558; 359/563; 359/566; 359/618; 359/641; 359/462; 359/278; 359/737; 349/201; 398/85; 398/201; 385/37; 356/328

(58) Field of Classification Search .......... 359/276, 359/278, 462, 558, 559, 563, 566, 618, 625, 359/626, 629, 634, 641, 737; 349/104, 201, 349/202; 398/83, 85, 201; 385/14–18, 37, 385/131; 356/328; 353/7–9; 348/51
See application file for complete search history.

(56) References Cited

U.S. PATENT DOCUMENTS

| | | | |
|---|---|---|---|
| 6,667,824 B2 * | 12/2003 | Bayart et al. | 359/254 |
| 6,795,182 B2 * | 9/2004 | Rakuljic et al. | 356/328 |
| 7,127,172 B1 * | 10/2006 | Chen | 398/85 |
| 7,258,456 B2 * | 8/2007 | Gouch | 359/615 |
| 7,289,697 B2 * | 10/2007 | Dorrer et al. | 385/18 |
| 7,697,191 B2 * | 4/2010 | Gluckstad | 359/279 |
| 7,843,636 B2 * | 11/2010 | Iwamoto et al. | 359/462 |
| 7,929,134 B2 * | 4/2011 | Hu et al. | 356/328 |
| 8,041,163 B2 * | 10/2011 | Levner et al. | 385/37 |
| 8,121,482 B2 * | 2/2012 | Khan | 398/83 |
| 8,220,929 B2 * | 7/2012 | Miyawaki et al. | 353/7 |
| 2006/0067611 A1 | 3/2006 | Frisken et al. | |
| 2011/0268445 A1 * | 11/2011 | Sakurai | 398/79 |

FOREIGN PATENT DOCUMENTS

| | | |
|---|---|---|
| JP | H11-101944 A | 4/1999 |
| JP | 2009-180836 A | 8/2009 |
| JP | 2009-222879 A | 10/2009 |

* cited by examiner

Primary Examiner — Loha Ben
(74) Attorney, Agent, or Firm — McGlew and Tuttle, P.C.

(57) ABSTRACT

Light from an optical fiber is incident on a frequency dispersion element. The frequency dispersion element disperses the incident light into light beams in different directions according to their frequencies and directs the dispersed light beams to a lens. The lens develops the incident light beams over an xy plane according to their frequencies in a strip-like form. A frequency selective element has pixels arranged in a frequency dispersion direction and brings pixels located at positions corresponding to the frequency to be selected into a reflective state. A light beam selected by the frequency selective element is emitted from an optical fiber through the same path. By changing reflection characteristics of the frequency selective element according to each pixel, optical filter characteristics can be desirably changed so as to achieve change of passband width and frequency shift.

14 Claims, 15 Drawing Sheets

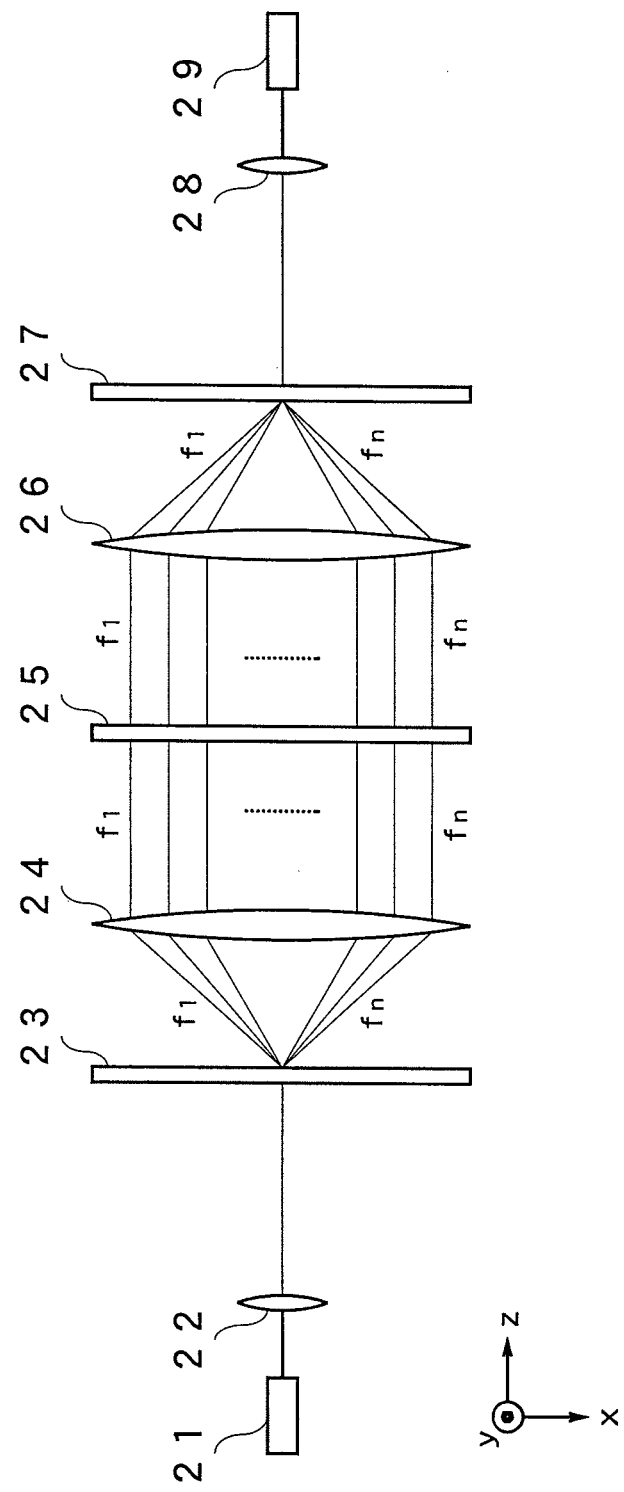

F I G. 4A
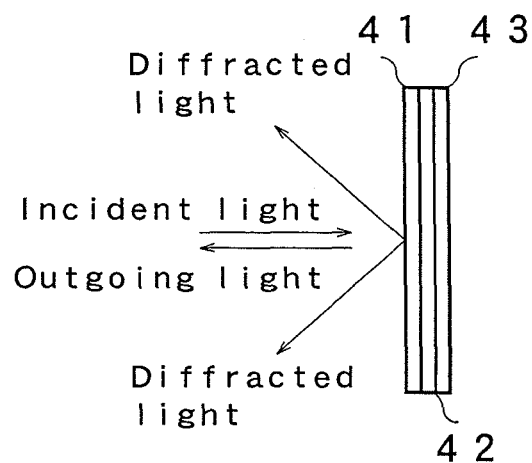
F I G. 4B
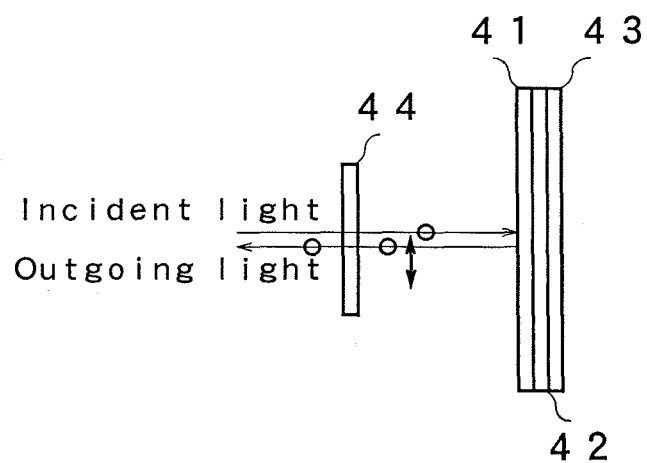

F I G. 1 1 A
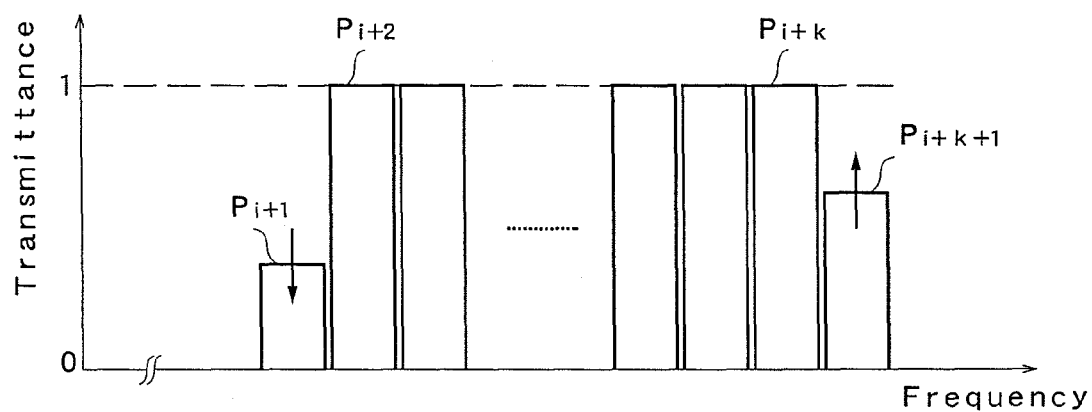
F I G. 1 1 B
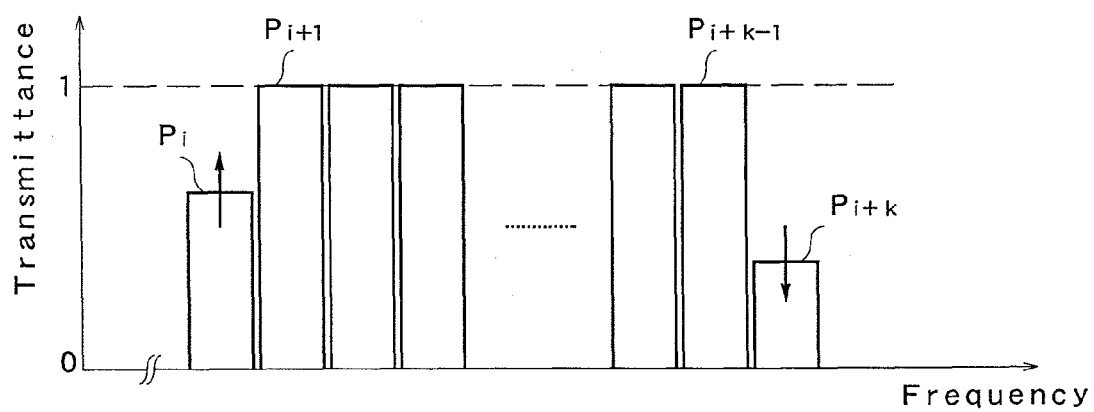

OPTICALLY VARIABLE FILTER APPARATUS AND FILTER CHARACTERISTIC CONTROL METHOD THEREOF

BACKGROUND OF THE INVENTION

1. Field of the Invention

The present invention relates to an optically variable filter apparatus and its filter characteristic control method that are used in optical communication field and spectroscopic analysis field.

2. Discussion of the Related Art

Nowadays, an optically variable filter is widely used in various fields represented by the optical communication field and spectroscopic analysis field. Especially in the optical communication field, in order to meet increasing demand for an increase in transmission capacity in recent years, a higher transmission rate and new modification format have been actively researched and developed, and an optical network has become complicated. In such optical network, the optically variable filter capable of changing a light beam having a desired wavelength in optical signal is used. In such optical filter, in order to achieve optimum filtering with respect to the transmission rate and modification format of each optical signal, there is a demand for a function of dynamically controlling a filter center frequency and passband at an optical frequency level in addition to the conventional frequency selective function.

For example, US2006/0067611A1 discloses an optically variable filter using a two-dimensional reflection-type LCOS (Liquid Crystal On Silicon)-based liquid crystal element (hereinafter referred to as LCOS element) as a frequency selective element.

SUMMARY OF THE INVENTION

In an optically variable filter apparatus, there is a demand for a function of controlling a filter center frequency or changing a passband so as to be optimum with respect to the transmission rate and modification format of each optical signal. To change the center frequency or passband, it is considered that light is dispersed in different directions according to the optical frequency, the dispersed light beams are incident on a frequency selective element having a lot of pixels and the transmittance is ON/OFF controlled for each pixel.

However, frequency resolution is limited to a frequency assigned to each pixel. The assigned frequency is determined by a product of reciprocal linear dispersion amount D as frequency per unit length on the plane of the frequency selective element and a pixel width d in the frequency dispersion direction (D·d). Thus, in order to achieve higher resolution of frequency selective characteristics, it is needed to reduce the pixel width or reciprocal linear dispersion amount, thereby causing problems that the apparatus is increased in size and the frequency selective element having a lot of pixels is required. Therefore, it has been demanded to enhance the frequency resolution without having to increase the apparatus in size and refine the frequency selective element.

In consideration of these problems of the conventional optically variable filter apparatus, a technical object of the present invention is to enhance the frequency selective resolution and continuously change filter characteristics without having to increase the apparatus in size or fine the frequency selective element.

In order to solve the problems, a first aspect of the present invention is directed to an optically variable filter apparatus which comprises: an entrance/exit section which receives a light beam and allows exit a light beam of selected frequencies; a frequency dispersion element which spatially disperses the light beam incident on said entrance/exit section according to their frequencies and synthesizes reflected light beams; a light condensing element which condenses light beams dispersed by said frequency dispersion element as parallel light beams; a frequency selective element which has a plurality of pixels placed at positions at least in a frequency dispersion direction so as to receive light beams condensed by said light condensing element, and which changes reflection characteristics of each pixel to obtain desired frequency selective characteristics; and a frequency selective element driving unit which drives each pixel of said frequency selective element to gradation-control transmission characteristics according to frequencies of the incident light beam.

A second aspect of the present invention is directed to an optically variable filter apparatus which comprises: an entrance section which receives a light beam; a frequency dispersion element which spatially disperses the light beam received by said entrance section according to their frequencies; a first light condensing element which condenses light beams dispersed by said frequency dispersion element; a frequency selective element which has a plurality of pixels placed at positions at least in a frequency dispersion direction so as to receive light beams condensed by said light condensing element, and which changes transmission characteristics of each pixel to obtain desired frequency selective characteristics; a frequency selective element driving unit which drives each pixel of said frequency selective element to gradation-control optical transmission characteristics according to frequency of the incident light beams; a second light condensing element which condenses light beams passed through said frequency selective element; a frequency synthesizing element which synthesizes the dispersed light beams condensed by said second light condensing element; and an exit section which allows exit the light beam synthesized by said frequency synthesizing element.

In the optically variable filter apparatuses, said frequency selective element driving unit controls the pixels of said frequency selective element at least four gradations.

In the optically variable filter apparatuses, a pixel width in the frequency dispersion direction in said frequency selective element is smaller than a beam radius of an incident light beam to said frequency selective element in the frequency dispersion direction.

In the optically variable filter apparatuses, said frequency selective element is an LCOS element having a plurality of pixels arranged at least in a one-dimensional manner, and said frequency selective element driving unit controls a voltage applied to each pixel according to the frequency selective characteristics.

In the optically variable filter apparatuses said frequency selective element is a liquid crystal element having a plurality of pixels arranged at least in a one-dimensional manner, and said frequency selective element driving unit controls a voltage applied to each pixel according to the frequency selective characteristics.

To solve the problems, a third aspect of the present invention is directed to a filter characteristic control method in an optically variable filter apparatus which has a frequency selective element having a plurality of pixels placed at positions at least in a frequency dispersion direction so as to receive light beams, comprising the steps of: upon setting a ratio of incident to emitted light beams emitted through pixel group each composed of at least one pixel of said frequency selective element, the pixel corresponding to each frequency of the incident light beam, to transmittance of the pixel group, bringing successive desired pixel groups into an optical transmissive state; and gradually increasing transmittance of at least one first control pixel group adjacent to one end pixel group among pixel groups in a transmission frequency range and transmittance of at least one second control pixel group adjacent to the other end pixel group among the pixel groups in said transmission frequency range, thereby increasing a bandwidth.

A forth aspect of the present invention is directed to a filter characteristic control method in an optically variable filter apparatus which has a frequency selective element having a plurality of pixels placed at positions at least in a frequency dispersion direction so as to receive light beams, comprising the steps of: upon setting a ratio of incident to emitted light beams emitted through pixel group each composed of at least one pixel of said frequency selective element, the pixel corresponding to each frequency of the incident light beam, to transmittance of the pixel group, bringing successive desired pixel groups into an optical transmissive state; and gradually decreasing transmittance of at least one first control pixel group which is one end pixel group among pixel groups in a transmission frequency range and transmittance of at least one second control pixel group which is the other end pixel group among the pixel groups in said transmission frequency range, thereby decreasing a bandwidth.

A fifth aspect of the present invention is directed to a filter characteristic control method in an optically variable filter apparatus which has a frequency selective element having a plurality of pixels placed at positions at least in a frequency dispersion direction so as to receive light beams, comprising the steps of: upon setting a ratio of incident to emitted light beams emitted through pixel group each composed of at least one pixel of said frequency selective element, the pixel corresponding to each frequency of the incident light beam, to transmittance of the pixel group, bringing successive desired pixel groups into an optical transmissive state; gradually increasing transmittance of at least one first control pixel group adjacent to one end pixel group among pixel groups in a frequency changing direction in a transmission frequency range; and gradually decreasing transmittance of at least one second control pixel group which is the other end pixel group among the pixel groups in said transmission frequency range, thereby changing a center frequency in said transmission frequency range along a frequency axis.

According to the present invention having such features, light beams dispersed according to their frequencies are made correspond to a plurality of pixels arranged in the dispersion direction and the transmittance of the pixels is continuously controlled. Accordingly, the frequency resolution can be enhanced without having to increase the apparatus in size and highly refine the frequency selective element. As a result, it is possible to change a passband width and center frequency of the passband with high resolution.

BRIEF DESCRIPTION OF THE DRAWINGS

FIG. 2B is a diagram showing optical arrangement of the transmission-type optically variable filter apparatus in accordance with the second embodiment of the present invention as seen in the y-axis direction;

FIG. 4A is a diagram showing an example of a modulation mode of an LCOS element used in the first embodiment of the present invention;

FIG. 4B is a diagram showing another example of the modulation mode of the LCOS element used in the first embodiment of the present invention;

FIG. 11A is a diagram showing a control method in the case where a center frequency of the band-pass filter is increased in the first and second embodiments of the present invention;

FIG. 11B is a diagram showing a control method in the case where the center frequency of the band-pass filter is decreased in the first and second embodiments of the present invention;

DESCRIPTION OF THE PREFERRED EMBODIMENTS

First Embodiment

Figure 1A:
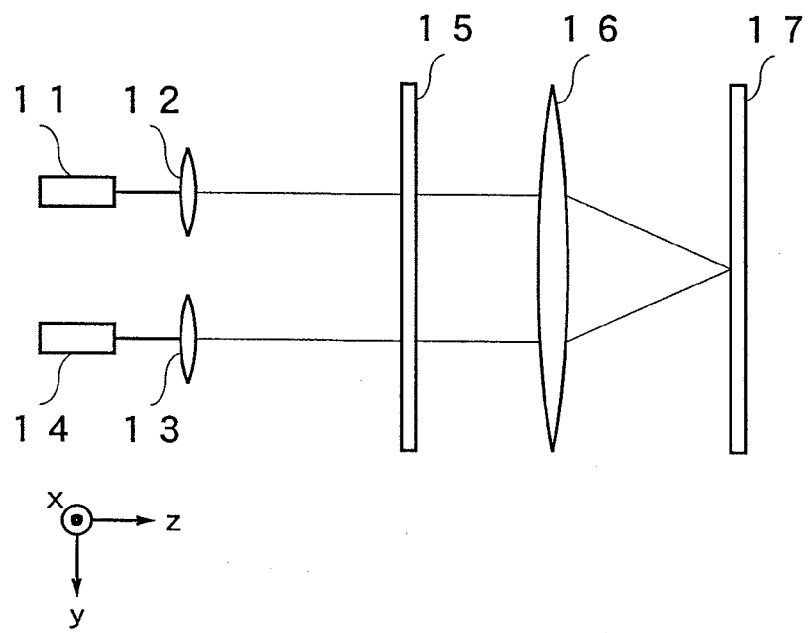
FIG. 1A is a diagram showing optical arrangement of a reflection-type optically variable filter apparatus in accordance with a first embodiment of the present invention as seen in an x-axis direction.
Figure 1B:
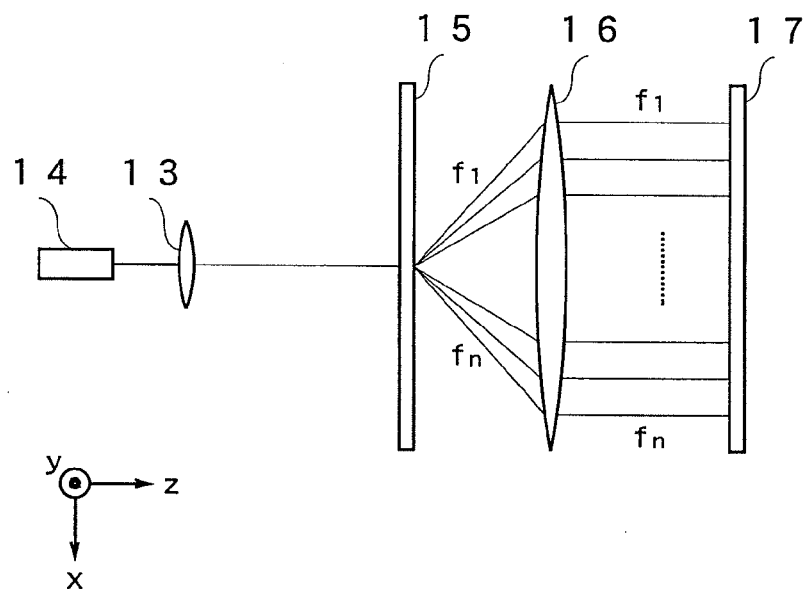
FIG. 1B is a diagram showing optical arrangement of the reflection-type optically variable filter apparatus in accordance with the first embodiment of the present invention as seen in a y-axis direction.

FIG. 1A is a side view showing a configuration of optical elements constituting a reflection-type optically variable filter apparatus in accordance with a first embodiment of the present invention as seen in an x-axis direction and FIG. 1B is a side view showing the configuration as seen in a y-axis direction. Incident light is assumed as, for example, a WDM signal light beam resulting from multiplexing of optical signals ranging in frequency from $f_1$ to $f_n$. A WDM light beam is exited from a collimator lens 12 through an optical fiber 11. Light incident on a collimator lens 13 is inputted to an optical fiber 14. The light exited from the collimator lens 12 is parallel to a z-axis direction and incident on a frequency dispersion element 15. The frequency dispersion element 15 acts to disperse light in different directions on an xz plane according to its frequency. Herein, the frequency dispersion element 15 may be constructed of a diffraction grating or prism or the like, or may be constructed of a combination of the diffraction grating and prism. The light beams dispersed by the frequency dispersion element 15 are fed to a lens 16. The lens 16 is a light condensing element for condensing the light beams dispersed on the xz plane in a direction parallel to the z axis and the condensed light beams are incident perpendicularly on a frequency selective element 17.

Herein, FIG. 1B shows light having a frequency range from a lowest frequency $f_1$ to a highest frequency $f_n$ by way of example. However, incident light is in reality WDM signal light having a lot of spectra in a range from the frequency $f_1$ to the frequency $f_n$. Therefore, the beams of WDM signal light developed over the xz plane are directed, in a strip-like form, to the frequency selective element 17. The frequency selective element 17 selectively reflects the incident light beams. Selective characteristics of the optical filter are determined on the basis of reflection characteristics of the frequency selective element 17, which will hereinafter be described in detail. The light beams reflected from the frequency selective element 17 pass through the same path to enter the lens 16, and are then directed to the frequency dispersion element 15 once again. The frequency dispersion element 15 synthesizes the reflected light beams in the same direction as the condensing direction of the original incident light, and the condensed light is inputted to the optical fiber 14 through the collimator lens 13. Here, the optical fibers 11, 14 and collimator lenses 12, 13 constitute a entrance/exit section for receiving a light beam and exiting selected light beam.

In the present embodiment, an optical axis of the incident light is separated from that of emitted light. However, a common optical axis may be employed and the incident/emitted light may be guided to an identical fiber and separated by a circulator into incident/emitted light beams. Then, the separated incident/emitted light beams may be guided to respective optical fibers 11, 14.

Second Embodiment

Figure 2A:
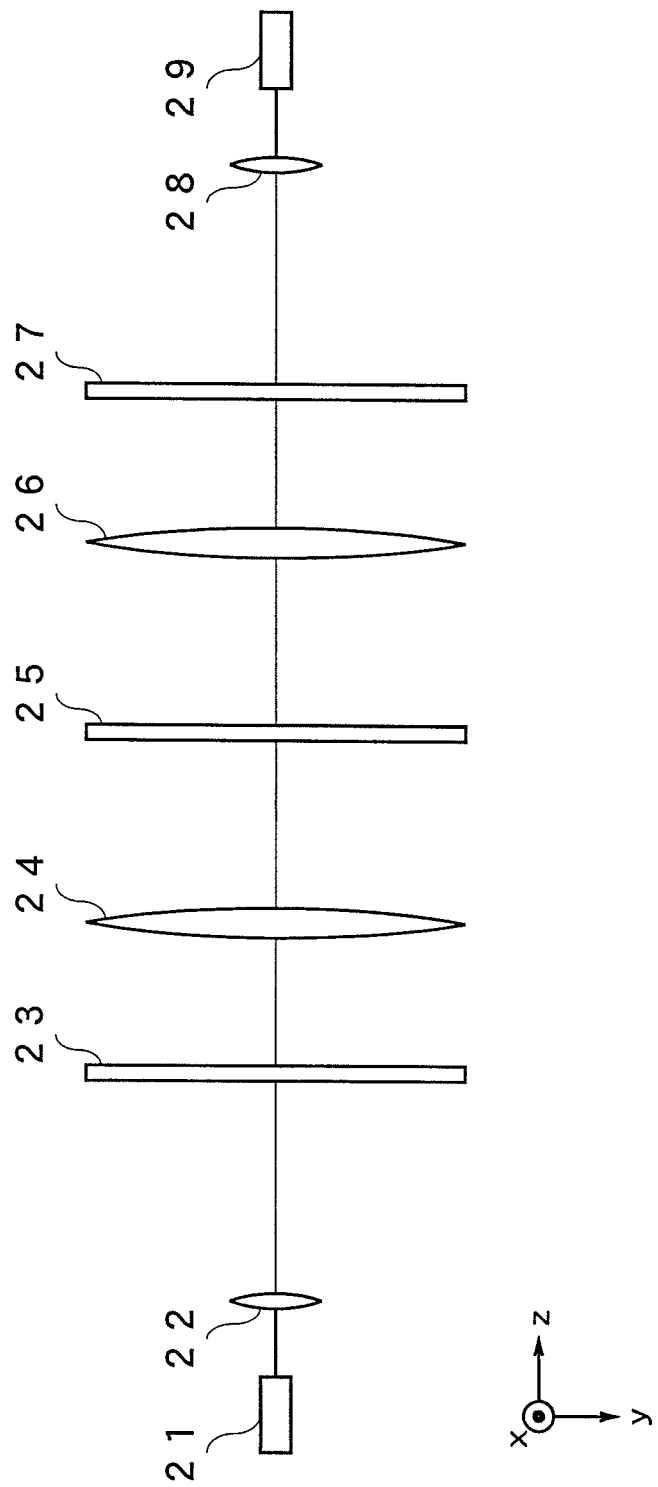
FIG. 2A is a diagram showing optical arrangement of a transmission-type optically variable filter apparatus in accordance with a second embodiment of the present invention as seen in the x-axis direction.

Next, a transmission-type optically variable filter apparatus in accordance with a second embodiment of the present invention will be described. FIG. 2A is a side view showing a configuration of optical elements constituting a transmission-type optically variable filter apparatus in accordance with a second embodiment of the present invention as seen in an x-axis direction and FIG. 2B is a side view showing the configuration as seen in a y-axis direction. In FIG. 2A, similarly, incident light is WDM signal light described in the first embodiment. The WDM signal light is incident on a collimator lens 22 from an optical fiber 21 and fed to a first frequency dispersion element 23 as parallel light beams. The optical fiber 21 and collimator lens 22 constitute an entrance section for receiving the WDM signal light. Like the frequency dispersion element 15, the frequency dispersion element 23 may be constructed of a diffraction grating or prism or the like, or may be constructed of a combination of the diffraction grating and prism. As shown in FIG. 2B, the frequency dispersion element 23 emits light beams on an xz plane in different directions according to their optical frequencies. These light beams are incident on a lens 24. The lens 24 is a first light condensing element for condensing the light beams dispersed on the xz plane in a direction parallel to the z-axis direction. A frequency selective element 25 is disposed perpendicular to an optical axis of the lens 24. The frequency selective element 25 allows the incident light beams to partially pass through and details thereof will be described later. The light beams passed through the frequency selective element 25 are incident on a lens 26. The lens 24 and frequency dispersion element 23, and the lens 26 and a frequency synthesizing element 27 are symmetric with respect to an xy plane located at the center of the frequency selective element 25. The lens 26 is a second light condensing element for condensing the parallel light beams on the xz plane. The frequency synthesizing element 27 synthesizes light beams having different frequency components from different directions and emits the synthesized light. The light synthesized by the frequency synthesizing element 27 is fed to an optical fiber 29 through a collimator lens 28. The collimator lens 28 and optical fiber 29 constitute an exit section for emitting a light beam of selected frequency.

(Configuration of Frequency Selective Element)

Next, the frequency selective elements 17, 25 used in the optically variable filter apparatuses in accordance with the first and second embodiments will be described below. In the first and second embodiments, when the incident light is dispersed on the xz plane according to frequency and the dispersed light beams are incident on the frequency selective elements 17, 25 as strip-like light beams, an incident region is defined as a rectangular region R shown in FIG. 3A. The optically variable filter apparatus in the first embodiment can select light beams of desired frequencies by selecting corresponding pixels for reflection. The optically variable filter apparatus in the second embodiment can select light beams having desired frequencies by selecting corresponding pixels for transmission. A setting unit 30 is connected to each of the frequency selective elements 17, 25 through a driver 31. The setting part 30 determines the pixels that reflect or transmit light on the xy plane according to selected frequencies. The driver 31 includes D/A converters for converting inputted digital signals to voltages applied to pixels. The setting part 30 and driver 31 constitute a frequency selective element driving unit for driving each of pixel electrode plates arranged in the xy direction of the frequency selective element to control characteristics of pixels located at predetermined positions in the x-axis and y-axis directions.

Next, specific examples of the frequency selective element 17 will be described. A first example of the frequency selective element 17 is a two-dimensional reflection-type LCOS (Liquid Crystal On Silicon)-based liquid crystal element (hereinafter referred to as LCOS element) 17A1. The two-dimensional LCOS element 17A1 has a built-in liquid crystal modulation driver located at the back of the element. Accordingly, the number of pixels can be increased, and thus, the LCOS element 17A1 can be formed of a lot of pixels arranged, for example, in a 1000×1000 lattice pattern. In the LCOS element 17A1, since light beams are incident separately at different positions according to their frequencies, by bringing pixels corresponding to the incidence position of a target light beam into reflective state, it is possible to select the light beam of a specific frequency.

Figure 3A:
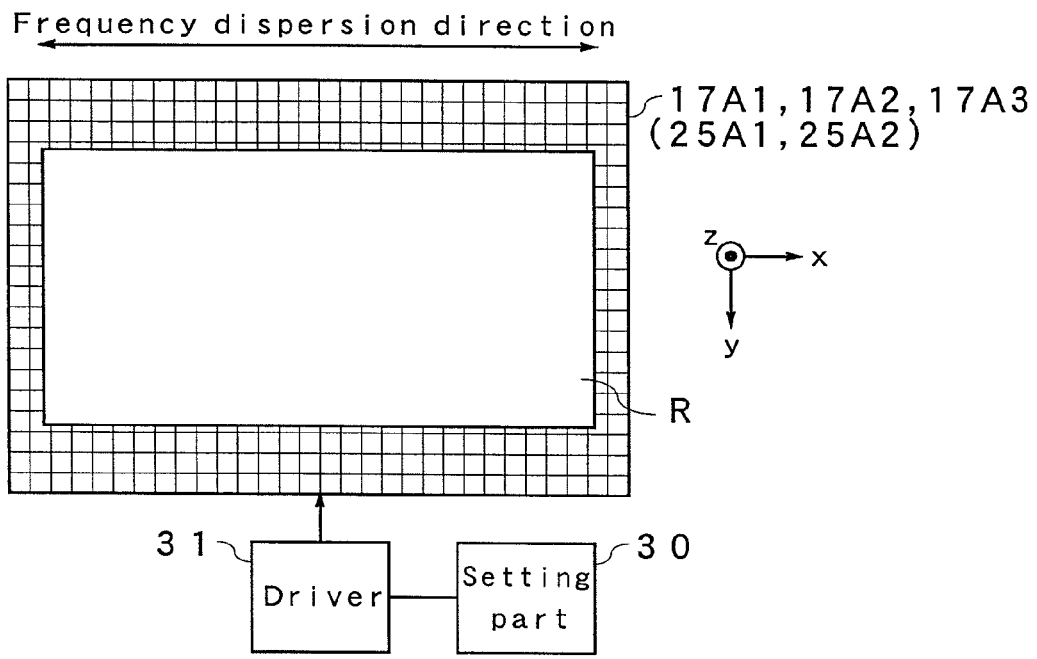
FIG. 3A is a diagram showing a two-dimensional frequency selective element used in the optically variable filter apparatuses in accordance with the first and second embodiments of the present invention.

Now, as one of modulation modes applicable to the LCOS element 17A1, a phase modulation mode will be explained. FIG. 4A is a schematic diagram showing the LCOS element 17A1. The LCOS element 17A1 is composed of a transparent electrode 41, liquid crystal 42 and back reflection electrode 43 that are arranged from an incident side plane along the z-axis direction in a layered structure. In the LCOS element 17A1, as shown in FIG. 3A, since a plurality of pixels are assigned to positions corresponding to one frequency in the y-axis direction, it is possible to impart unevenness to a refractive index profile with respect to a plurality of pixels and thereby develop a diffraction phenomenon by applying a voltage between the transparent electrode 41 and back reflection electrode 43 for the plurality of pixels. In addition, the diffraction angles of different frequency components can be controlled independently, so that an input light beam having a specific frequency can be simply reflected in the incident direction, and light beams of other frequency components can be diffracted as unnecessary light beam and reflected in a direction different from the incident direction. By controlling a voltage to be applied to each pixel in an analog manner, necessary pixels can be brought from a reflective state to non-reflective state while continuously gradation-controlling the reflectance. By bringing desired pixels in the x-axis direction into the reflective state, it is possible to select light beams of desired frequencies among the incident light beams. The reflectance with respect to each frequency component is not merely ON/OFF controlled, but controlled with at least four gradations.

Next, as one of modulation modes applicable to the LCOS element 17A1, an intensity modulation mode will be explained. FIG. 4B is a diagram showing a wavelength selective method based on the intensity modulation mode. A polarizer 44 is placed on an incidence plane for incident light. The polarizer 44 brings incident light into a specific polarized state as indicated by a circle in the diagram, and the polarized light is incident on the reflection-type LCOS element 17A1. Also in this case, the LCOS element 17A1 is composed of the transparent electrode 41, liquid crystal 42 and back reflection electrode 43. In the LCOS element 17A1, a difference in the double refraction index in the liquid crystal between the electrodes can be controlled on the basis of the voltage application conditions. In the intensity modulation mode, the same voltage is simultaneously applied to pixels aligned in the y-axis direction in FIG. 3A. Accordingly, a polarization state of reflected light can be varied by controlling the polarization state of the pixels to which the voltage is applied. Then, it is determined whether or not a polarization plane is rotated or retained at the time of voltage control in accordance with orientational ordering among liquid-crystal molecular components. For example, assuming that the polarization plane is retained in the absence of voltage application, the light indicated by the circle is simply reflected. On the other hand, in the presence of voltage application, the polarization plane is rotated to effect reflection, and thus the reflected light is shielded by the polarizer 44. Accordingly, by controlling the voltage applied to the pixels in an analog manner, the incident light can be brought from the reflective state to the non-reflective state while continuously gradation-controlling the reflectance. By bringing desired pixels in the x-axis direction into the reflective states, it is possible to select light beams of desired frequencies among the incident light beams. Also in this case, the reflectance with respect to each frequency component is not merely ON/OFF controlled, but controlled with at least four gradations.

As a second example of the frequency selective element 17, a liquid crystal element 17A2 having a reflection-type two-dimensional electrode array will be described. The liquid crystal element 17A2 has no LCOS structure. The LCOS element has the built-in liquid crystal driver disposed at the back of each pixel. On the other hand, in the liquid crystal element 17A2, the liquid crystal modulation driver is provided at the outside of the element 17A2. The other configuration of the liquid crystal element 17A2 is the same as that of the LCOS element and can achieve the above-mentioned phase modulation mode and intensity modulation mode. Further, reflectance can be continuously gradation-controlled by changing voltage levels with respect to pixels in an analog manner.

Figure 5:
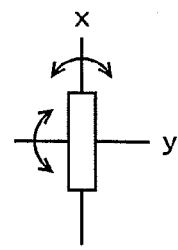
FIG. 5 is a diagram showing one pixel of an MEMS element in accordance with the first embodiment of the present invention.

As a third example of the frequency selective element 17, the two-dimensional MEMS element 17A3 will be described. The MEMS element in which a lot of MEMS mirrors are two-dimensionally arranged has been put into practical use as a Digital Micromirror Device (DMD). It is assumed that all pixels in one column of the MEMS mirror in the y-axis direction correspond to one optical frequency of the WDM signal. Also in the case of MEMS, since a plurality of pixels of the MEMS element are associated with one frequency band, the reflectance can be varied by controlling voltages applied to many pixels associated with one frequency and performing phase modulation. In addition, as shown in FIG. 5, by rotating each pixel of the MEMS element about the x axis or y axis, intensity modulation is performed. Moreover, the angle of the mirror can be adjusted by changing a level of a voltage to be applied to each pixel, thereby freely setting the amount of reflected light. Therefore, also in this case, the intensity level of light having selected frequencies can be gradation-controlled.

Figure 3B:
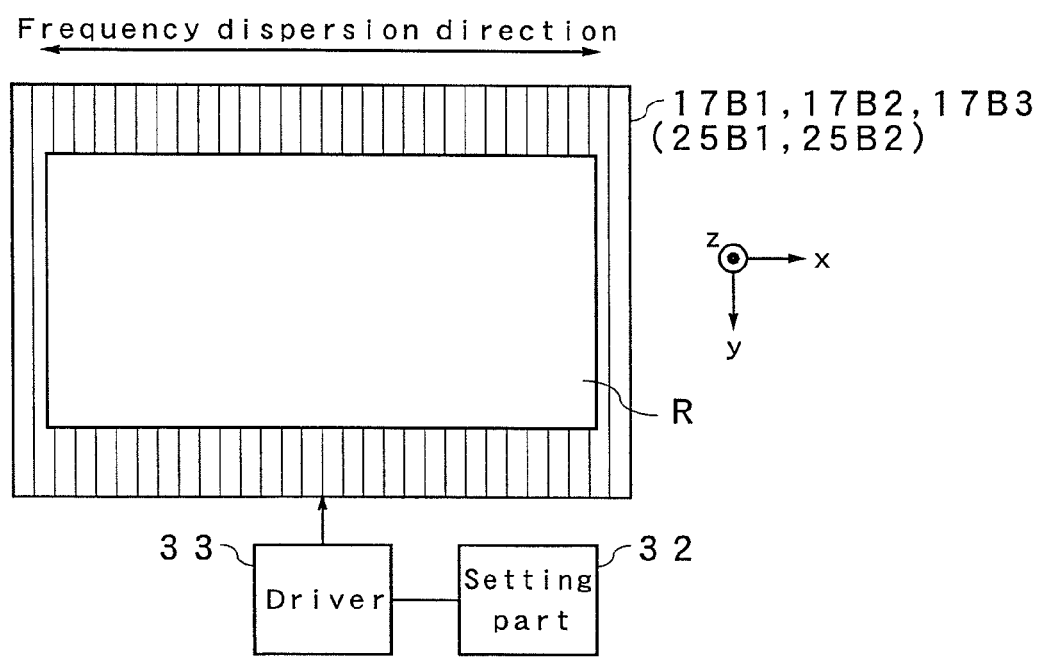
FIG. 3B is a diagram showing a one-dimensional frequency selective element used in the optically variable filter apparatuses in accordance with the first and second embodiments of the present invention.

Next, as a fourth example of the frequency selective element 17, a one-dimensional LCOS element 17B1 will be described. This frequency selective element 17B1 is, as shown in FIG. 3B, an LCOS element in which a lot of elongated pixels are arranged in the x-axis direction. Light beams dispersed along the x axis according to their frequencies are incident on the frequency selective element 17B1. Also in this case, a setting part 32 and driver 33 constitute a frequency selective element driving unit for driving each of pixel electrodes arranged in the x direction of the frequency selective element 17 to control characteristics of pixels located at predetermined positions in the x-axis direction. The LCOS element 17B1 is driven by the setting part 32 through the driver 33. In this case, the above-mentioned phase modulation mode is inapplicable, and the frequency is selected according to only the intensity modulation mode.

As a fifth example of the frequency selective element 17, a liquid crystal element 17B2 having a reflection-type one-dimensional electrode array can be employed. Also in this case, the above-mentioned phase modulation mode is inapplicable, and the frequency is selected according to only the intensity modulation mode.

Further, as a sixth example of the frequency selective element 17, a reflection-type one-dimensional MEMS mirror element 17B3 can be employed. Also in this case, the above-mentioned phase modulation mode is inapplicable, and the frequency is selected according to only the intensity modulation mode.

Next, the transmission-type frequency selective element 25 used in a wavelength variable filter apparatus in accordance with the second embodiment will be described. As a first example of the frequency selective element 25, a transmission-type two-dimensional LCOS element 25A1 can be employed. Also in the LCOS element 25A1, since light beams are incident separately at different positions according to their frequencies, by bringing pixels corresponding to the incidence position of a target light beam into the transmissive state, it is possible to select optical signals of the frequency.

Figure 6A:
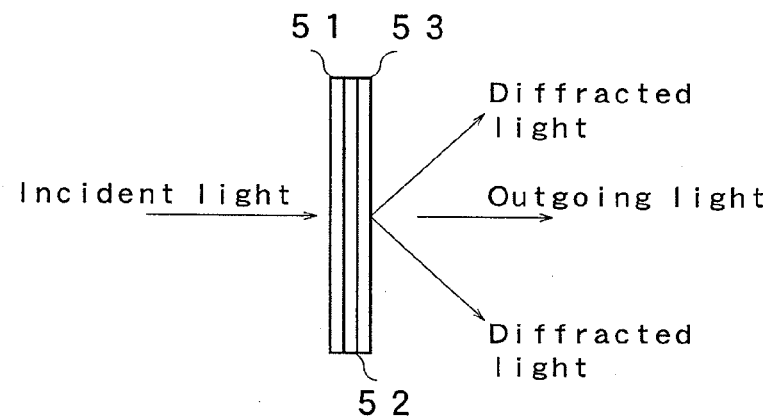
FIG. 6A is a diagram showing an example of a modulation mode of an LCOS element used in the second embodiment of the present invention.

Now, as one of modulation modes applicable to the LCOS element 25A1, a phase modulation mode will be explained. FIG. 6A is a schematic diagram showing the LCOS element 25A1. The LCOS element 25A1 is composed of a transparent electrode 51, liquid crystal 52 and back reflection electrode 53 that are arranged from an incident side plane along the z-axis direction in a layered structure. In the LCOS element 25A1, since a plurality of pixels are assigned to positions corresponding to one frequency in the y-axis direction, it is possible to impart unevenness to a refractive index profile with respect to a plurality of pixels and thereby develop a diffraction phenomenon by applying a voltage between the transparent electrode 51 and back reflection electrode 53 for the plurality of pixels. In addition, the diffraction angles of different frequency components can be controlled independently, so that an input light beam having a specific frequency can travel in a straight line in the z-axis direction and eventually pass through the element, and light beams of other frequency components can be diffracted as unnecessary light and diffracted in a direction different from the z-axis direction. By controlling a voltage to be applied to each pixel, necessary pixels can be brought into a transmissive state without causing diffraction. The transmittance with respect to each frequency component is not merely ON/OFF controlled, but controlled with at least four gradations.

Figure 6B:
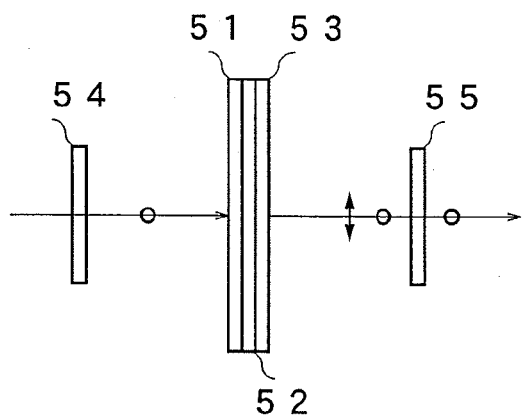
FIG. 6B is a diagram showing another example of the modulation mode of the LCOS element used in the second embodiment of the present invention.

Next, as another modulation mode applicable to the LCOS element, an intensity modulation mode will be explained. FIG. 6B is a diagram showing a wavelength selective method based on the intensity modulation mode. A polarizer 54 is placed on the incidence plane for incident light. The polarizer 54 brings the incident light into a specific polarized state as indicated by a circle in the diagram, and the polarized light is incident on the LCOS element 25A1. Also in this case, the LCOS element is composed of the transparent electrode 51, liquid crystal 52 and transparent electrode 53. A polarizer 55 is placed on the optical axis of the emitted light transmitted through the LCOS element. The polarizer 55 emits only light in a specific polarized state as indicated by the circle in the diagram. In the LCOS element, a difference in a double refraction index in the liquid crystal between the electrodes can be controlled on the basis of the conditions of voltage application. Accordingly, the polarization state of transmitted light can be varied by adjusting voltages to be applied independently. Then, it is determined whether the plane of polarization is rotated or retained at the time of voltage control in accordance with orientational ordering among liquid-crystal molecular components. For example, assuming that the polarization plane is retained in the absence of voltage application, then the light of polarization indicated by the circle is simply transmitted. On the other hand, in the presence of voltage application, the polarization plane is rotated to effect transmission, and thus the transmitted light is shielded by the polarizer 55. Therefore, the incident light can be selected by controlling voltages to be applied to the pixels. Here, by bringing desired pixels into a transmissive state, the light beam having the frequency corresponding to the pixels can be selected. Also in this case, the transmittance with respect to each frequency component is not merely ON/OFF controlled, but controlled with at least four gradations.

As a second example of the frequency selective element 25, a liquid crystal element 25A2 having a transmission-type two-dimensional electrode array can be employed. The liquid crystal element 25A2 has no LCOS structure. The LCOS element has the built-in liquid crystal driver disposed at the back of each pixel. On the other hand, in the liquid crystal element 25A2, the liquid crystal modulation driver is provided at the outside of the two-dimensional electrode array liquid crystal element 25A2. The other configuration of the liquid crystal element 25A2 is the same as that of the LCOS element and can achieve the above-mentioned phase modulation mode and intensity modulation mode. Further, the transmittance can be continuously gradation-controlled by changing the voltage level with respect to pixels in an analog manner.

As a third example of the frequency selective element 25, a one-dimensional LCOS element 25B1 will be described. This frequency selective element 25B1 is, as shown in FIG. 3B, a transmission-type LCOS element in which a lot of elongated pixels are arranged in the x-axis direction. WDM light beams dispersed along the x axis according to their frequencies are incident on the frequency selective element 25B1. Also in this case, the setting part 32 and driver 33 constitute a frequency selective element driving unit for driving each of pixel electrodes arranged in the x direction of the frequency selective element to control characteristics of pixels located at predetermined positions in the x-axis direction. The LCOS element 25B1 is driven by the setting part 32 through the driver 33. In this case, the above-mentioned phase modulation mode is inapplicable, and the frequency is selected according to only the intensity modulation mode.

As a fourth example of the frequency selective element 25, an electrode array liquid crystal element 25B2 having a transmission-type one-dimensional electrode array can be employed. Also in this case, the above-mentioned phase modulation mode is inapplicable, and the frequency is selected according to only the intensity modulation mode.
(Change of Bandwidth)

Next, frequency control of the optically variable filter apparatus in accordance with the first and second embodiments of the present invention will be described in detail. In the following description, even in the reflection-type optically variable filter apparatus in the first embodiment, part of incident light is reflected on each pixel of the frequency selective element and returns to the output side. The ratio of transmitted light at this time is assumed as transmittance. Further, in the following description, even in the two-dimensional frequency selective element, pixels corresponding to the same frequency, that is, pixels having a common x coordinate along the y axis, are regarded as one pixel group. In other words, in the following description, pixel groups $P_1$ to $P_m$ are arranged in the x-axis direction in the frequency selective element. In the one-dimensional frequency selective element, one pixel corresponds to the pixel group. Each of the pixel groups $P_1$ to $P_m$ has respective transmittance.

Figure 7A:
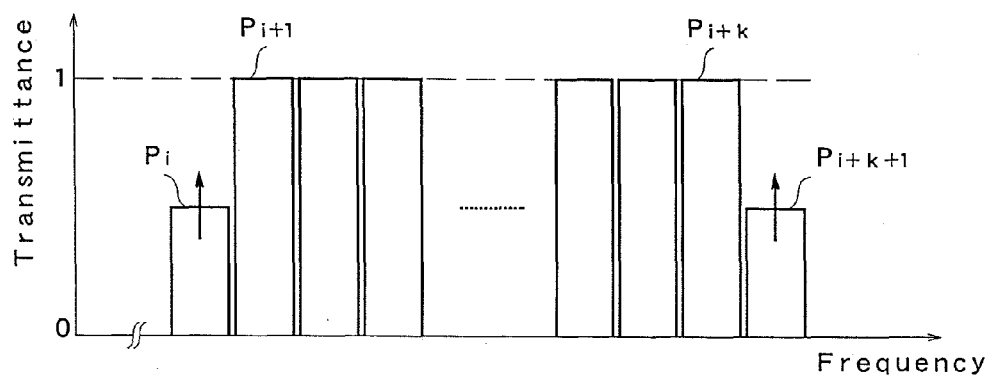
FIG. 7A is a diagram showing a control method to increase a bandwidth of a band-pass filter in the first and second embodiments of the present invention.
Figure 7B:
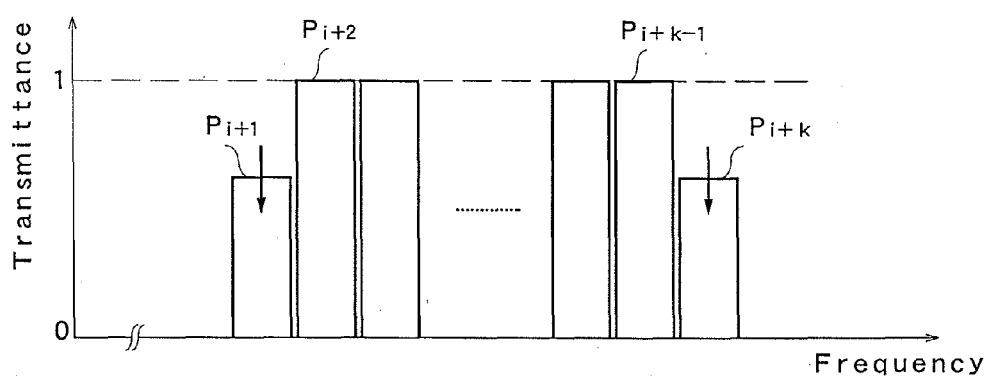
FIG. 7B is a diagram showing a control method to decrease the bandwidth of the band-pass filter in the first and second embodiments of the present invention.
Figure 8:
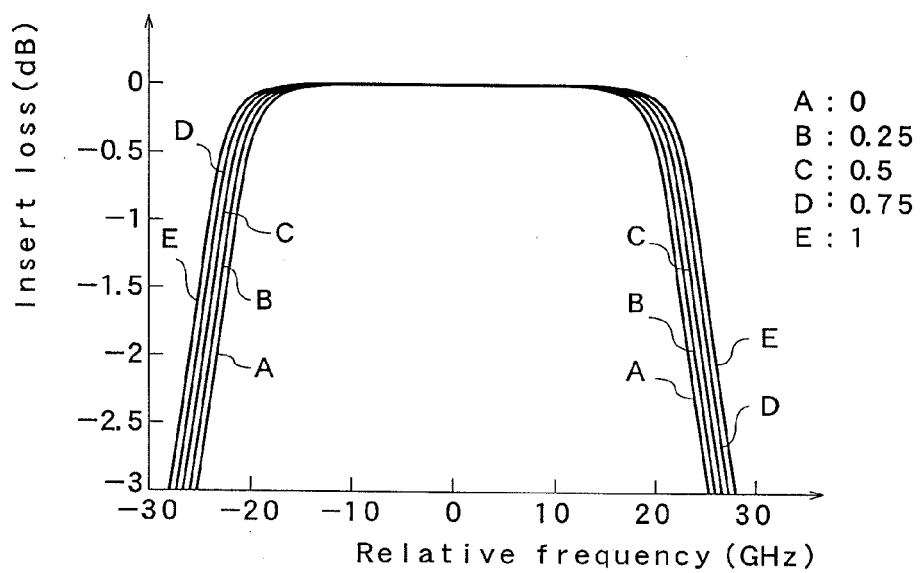
FIG. 8 is a diagram showing an example of changes of the bandwidth of the optically variable filter apparatus in accordance with the first and second embodiments of the present invention.

In an initial state, the transmittance of the pixel groups $P_{i+1}$ to $P_{i+k}$ (1<=i, k<=m) (i, k, and m are natural numbers) is set to 1 and the transmittance of the other pixel groups is set to 0. This causes a band-pass filter for allowing light to pass through a frequency band having the transmittance of 1. To increase the bandwidth, the transmittance of the pixel groups adjacent to the pixel groups $P_{i+1}$ and $P_{i+k}$ is continuously increased at the same time. Such pixel groups whose transmittance is changed are referred to as control pixel groups, and $P_i$ and $P_{i+k+1}$ are referred to as a first control pixel group and second control pixel group, respectively. FIGS. 7A and 7B are graphs showing frequency on a horizontal axis and transmittance of the pixel groups of the frequency selective element on a vertical axis. As shown in these graphs, the transmittance of the control pixel groups $P_i$ and $P_{i+k+1}$ is continuously changed in an analog manner. For example, as shown in FIG. 8, given that curves obtained by simultaneously increasing the transmittances of the control pixel groups $P_i$ and $P_{i+k+1}$ from 0 to 1 in units of 0.25 are A to E, by continuously increasing the transmittances from 0 to 1 at the same time, the bandwidth can be increased accordingly. FIG. 8 shows an example in the case where the optical filter used for the WDM signal having a channel width of 50 GHz satisfies following conditions:
(1) Linear dispersion amount on the plane of the frequency selective element, that is, pixel width per GHz, is 2.89 μm/GHz;
(2) Light beam radius w is 22.6 μm;
(3) Pixel width on the frequency selective element in the frequency dispersion direction is 8.5 μm; and
(4) There is one control pixel group on the high-frequency side and one control pixel group on the low-frequency side. In this example, as shown in the curves A to E, the transmission characteristics vary in the range from the bandwidth of ±25 GHz of the center frequency to the bandwidth of ±28 GHz of the center frequency. By continuously increasing the transmittances of the pixel groups at both ends, the bandwidth can be continuously increased.

Figure 9:
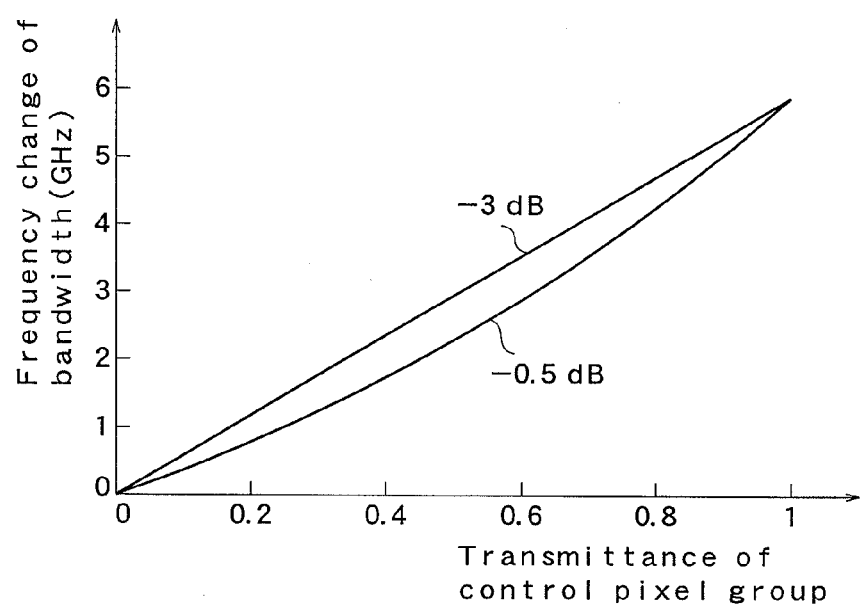
FIG. 9 is a diagram showing an example of changes of the bandwidth of the optically variable filter apparatus in accordance with the first and second embodiments of the present invention.

FIG. 9 shows the transmittance of the control pixel groups and bandwidth at −3 dB and bandwidth at −0.5 dB, revealing that the bandwidth becomes wider as the transmittance of the control pixel groups increases.

In the above-mentioned initial state, by gradually decreasing the transmittances of the pair of pixel groups $P_{i+1}$, $P_{i+k}$ (the first and second control pixel groups) at both ends among the pixel groups $P_{i+1}$ to $P_{i+k}$ constituting the band-pass filter from 1 to 0 as shown in FIG. 7B, the bandwidth can be decreased.

By continuously changing the transmittance of the pair of pixel groups on the high-frequency side and low-frequency side of predetermined bandwidth in the same direction in this manner, the bandwidth of the band-pass filter can be increased or decreased. Although the number of control pixel groups at both ends are one herein, the present invention is not limited to this, and a slope characteristic of the band-pass filter can be changed by simultaneously controlling a plurality of pixel groups in both sides. When the variable width of the passband is set to the frequency corresponding to the two pixel groups or greater, the variable width of the passband can be controlled unlimitedly and continuously by sequentially shifting the control pixel groups to adjacent pixel groups.

Figure 10:
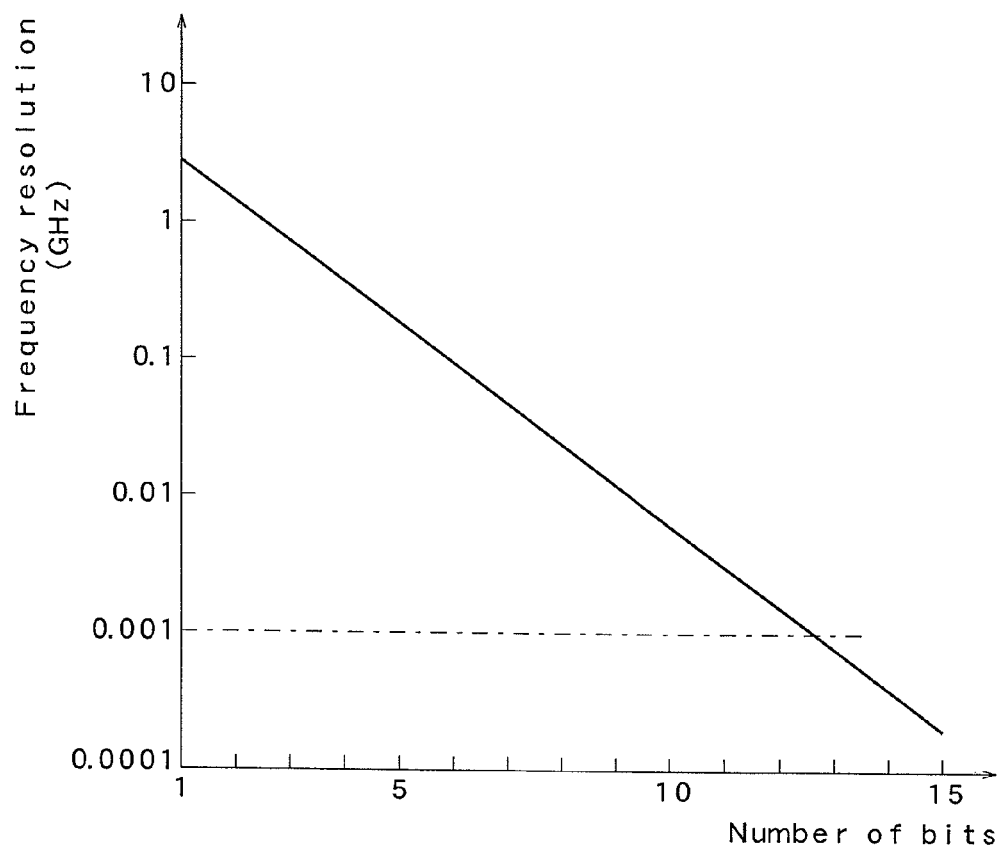
FIG. 10 is a diagram showing an example of frequency resolution with respect to the number of bits that varies transmittance of the optically variable filter apparatus in accordance with the first and second embodiments of the present invention.

Frequency resolution of the frequency selective element is determined depending on the voltage applied to the element. In the intensity modulation mode, gradations of voltage, that is, the number of bits of D/A converters included in the driver 31 or 33 directly correspond to the resolution. FIG. 10 shows resolution that can be set with respect to the number of bits inputted at intensity modulation. Also in the case, conditions are the same as the above-mentioned conditions (1) to (4). As apparent from this figure, frequency control in unit of MHz can be achieved by setting the number of bits to 13 or greater.
(Center Frequency Shift)

Figure 12A:
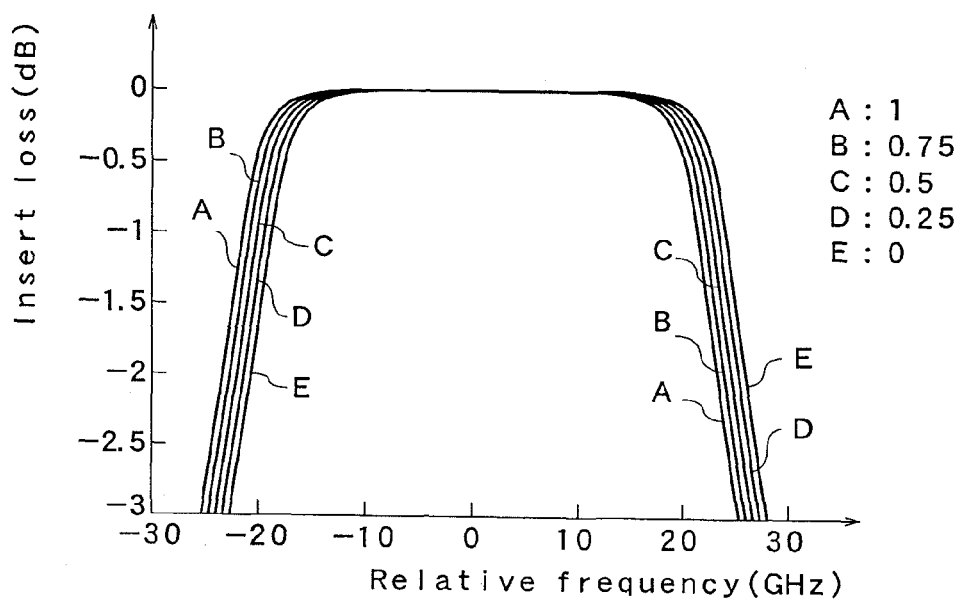
FIG. 12A is a diagram showing an example of the increase in the center frequency of the optically variable filter apparatus in accordance with the first and second embodiments of the present invention.
Figure 13:
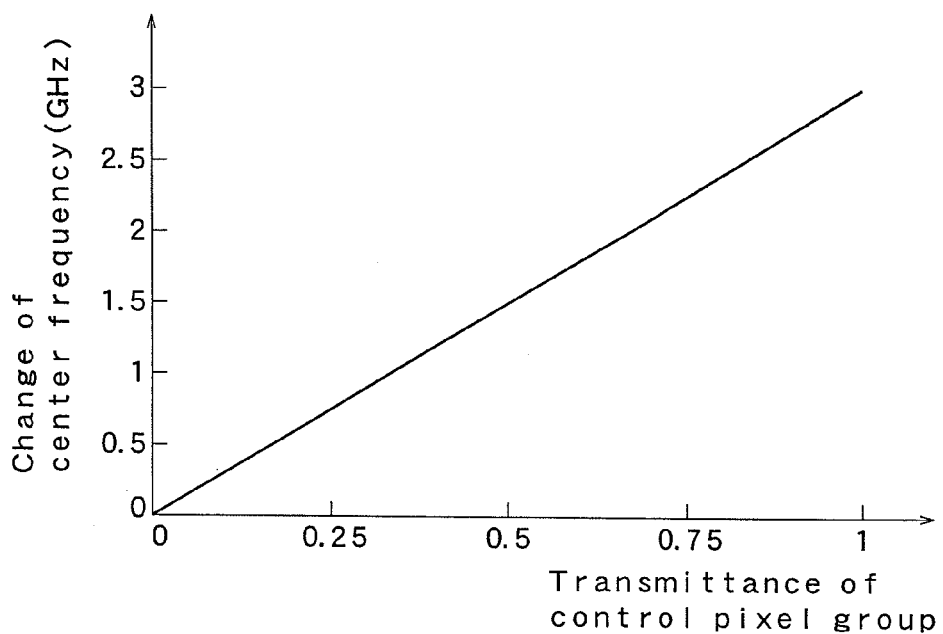
FIG. 13 is a diagram showing an example of the increase in the center frequency of the optically variable filter apparatus in accordance with the first and second embodiments of the present invention.
Figure 14:
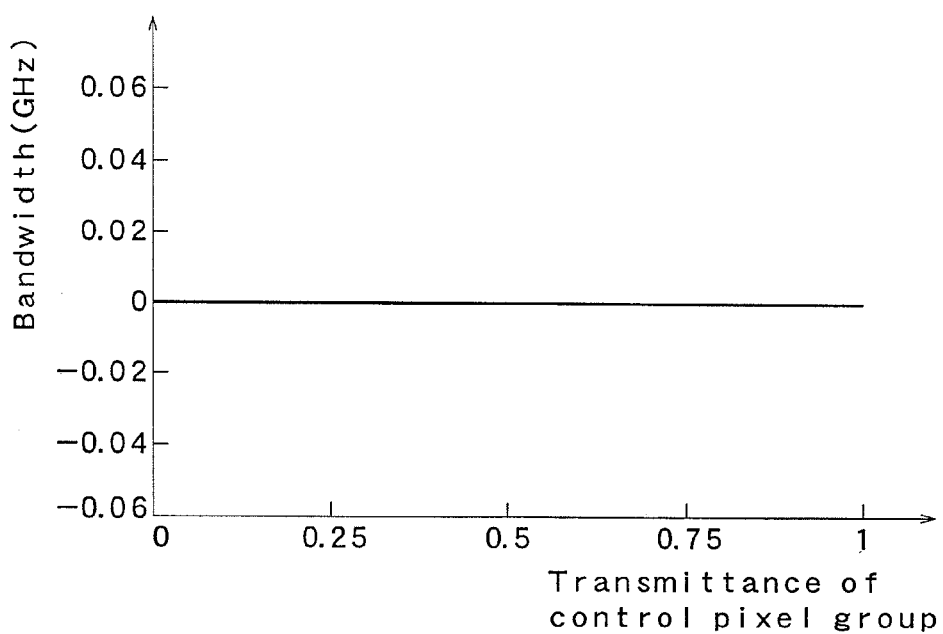
FIG. 14 is a graph showing a state where the bandwidth is not changed.

Next, a control method of shifting the center frequency of the band-pass filter will be described. First, it is assumed that the transmittances of the pixel groups $P_{i+1}$ to $P_{i+k}$ are 1 and the transmittances of the other pixel groups are 0, thereby the band-pass filter having a frequency range of light incident on the pixel groups $P_{i+1}$ to $P_{i+k}$ is formed. Here, when the passband is shifted to the high-frequency side, as shown in FIG. 11A, the transmittance of the pixel group $P_{i+k+1}$ (first control pixel group) adjacent to the pixel group $P_{i+k}$ of the highest frequency is gradually increased and the transmittance of the pixel group $p_{i+1}$ of the lowest frequency (second control pixel group) is gradually decreased. At this time, the transmittance is continuously changed so that a total of the transmittances of the control pixel groups $P_{i+1}$ and $P_{i+k+1}$ becomes 1. Thus, given that curves obtained by lowering the transmittance of the control pixel group $P_{i+1}$ from 1 to 0 in units of 0.25 are A to E, as shown in FIGS. 12A and 13, the center frequency of the band-pass filter can be continuously increased. When total of changes of the transmittance of the control pixel groups is set to 0, the bandwidth remains constant as shown in FIG. 14.

Figure 12B:
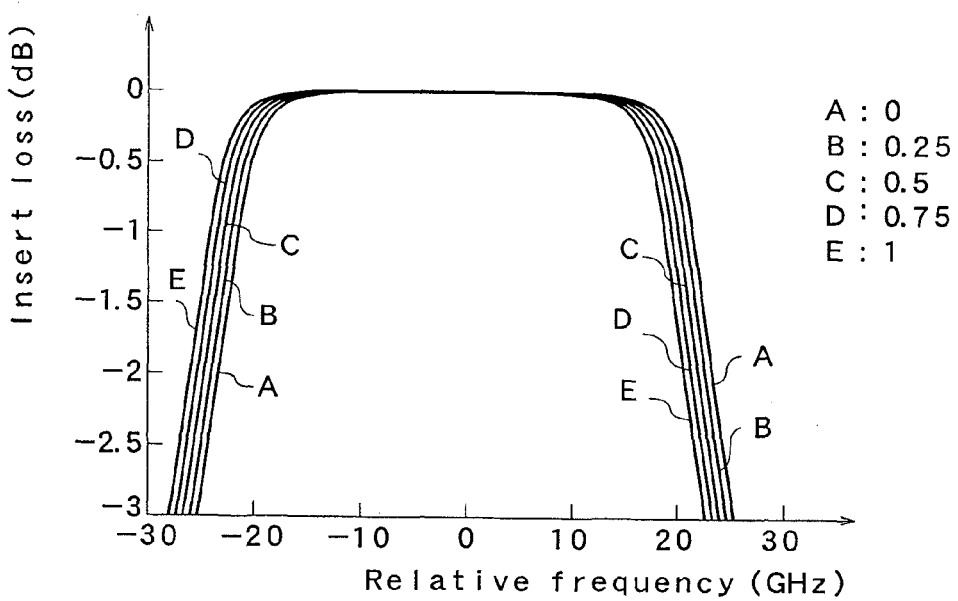
FIG. 12B is a diagram showing an example of the decrease in the center frequency of the optically variable filter apparatus in accordance with the first and second embodiments of the present invention.

Next, a control method of decreasing the center frequency of the filter from the above-mentioned initial state will be described. In this case, the transmittance is continuously controlled so as to increase the transmittance of the pixel group $P_i$ adjacent to the pixel group $P_{i+1}$ (first control pixel group) on the low-frequency side in the changing direction and decrease the transmittance of the pixel group $P_{i+k}$ (second control pixel group) on the high-frequency side. FIG. 11B shows a state where the transmittances of the control pixel groups $P_i$, $P_{i+k}$ on both sides are changed while satisfying the condition that the total transmittances thereof remains 1. Thus, given that curves obtained by increasing the transmittance of the control pixel group $P_i$ from 0 to 1 in units of 0.25 are A to E, as shown in FIG. 12B, the center frequency decreases according to changes of the transmittance of the control pixel groups. When total of changes of the transmittance of the control pixel groups is set to 0, the frequency can be shifted to the low-frequency side while keeping the bandwidth of the filter constant.

In both of the above-mentioned cases, when the variable width of the center frequency exceeds frequency for one pixel, the variable width of the center frequency can be controlled unlimitedly and continuously by sequentially shifting the control pixel groups to the adjacent pixel groups. Further, control in the order of MHz can be performed by increasing the number of bits as gradations of voltage applied to the frequency selective element.

Next, optical design conditions for the control method will be described. In the present embodiment, since an intermediate value of the transmittance of the pixel groups is reflected on the filter form, conditions that enable such continuous characteristic change are determined depending on a pixel width in the frequency dispersion direction in the control pixel group and input beam diameter. That is, it is assumed that, when the width of the control pixel group is greater than the input beam diameter of each frequency component of a WDM signal light beam, the transmittance designed for the control pixel group is directly reflected on filter waveform, generating distortion. Herein, the pixel width in the frequency dispersion direction in the frequency selective element is defined as d, and in a range of light intensity of $1/e^2$ of a peak or less, the beam radius of a light beam of each frequency component is defined as w. At this time, a parameter $\gamma$ determined by the pixel width d and beam radius w is introduced.

$$\gamma = w/d$$

Figure 15A:
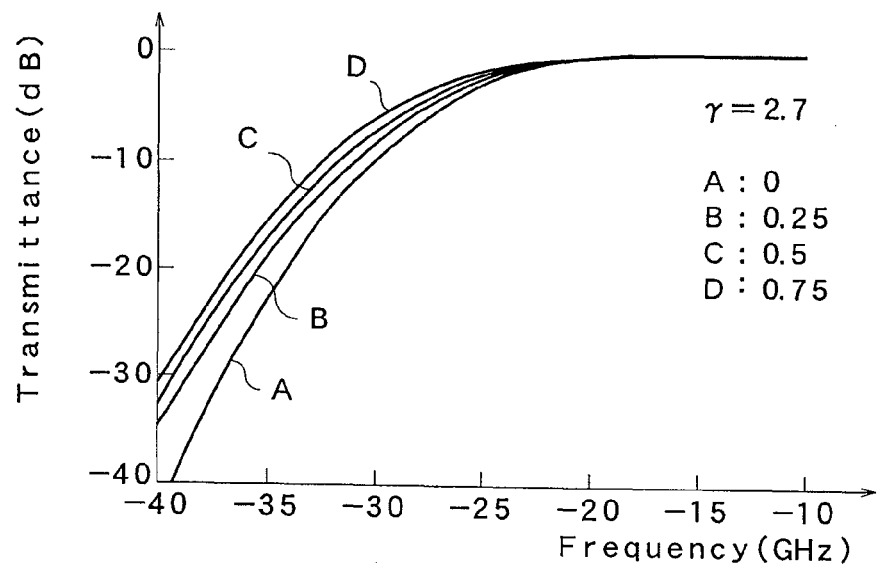
FIG. 15A is a graph showing relationship between change of the center frequency and transmittance in the case where the transmittance of a control pixel group is varied in the case of $\gamma=2.7$.
Figure 15B:
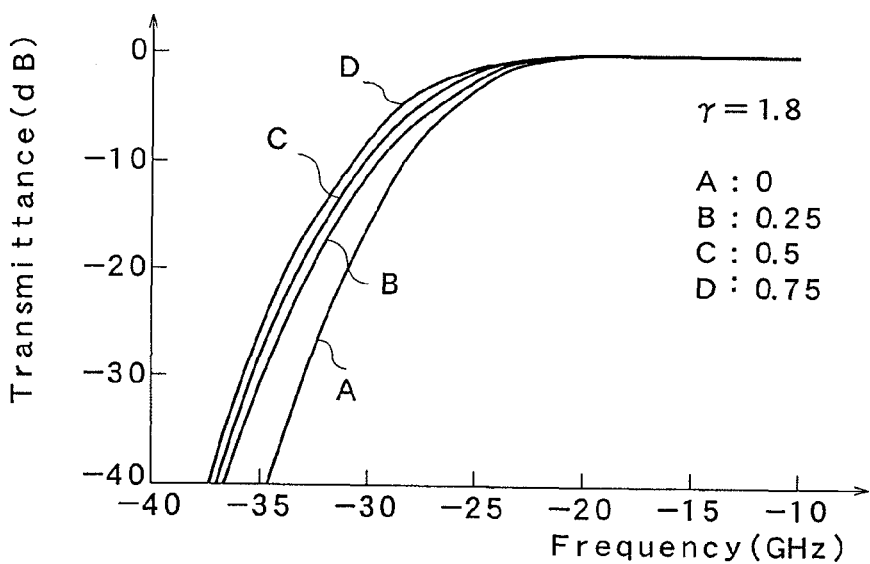
FIG. 15B is a graph showing relationship between change of the center frequency and transmittance in the case where the transmittance of a control pixel group is varied in the case of $\gamma=1.8$.
Figure 15C:
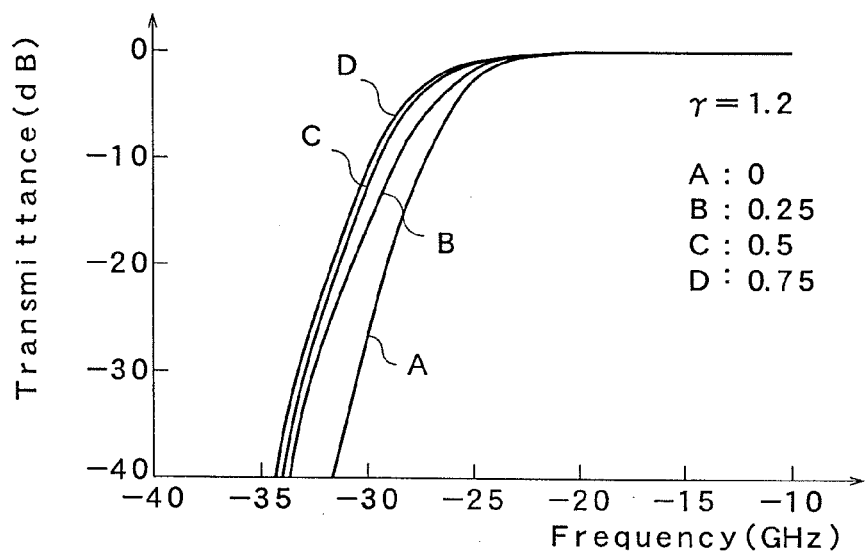
FIG. 15C is a graph showing relationship between change of the center frequency and transmittance in the case where the transmittance of a control pixel group is varied in the case of $\gamma=1.2$.
Figure 15D:
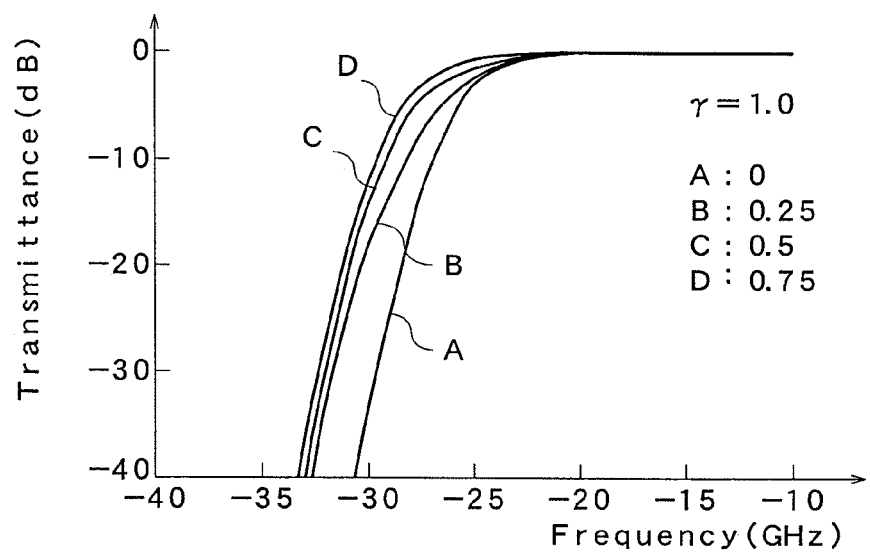
FIG. 15D is a graph showing relationship between change of the center frequency and transmittance in the case where the transmittance of a control pixel group is varied in the case of $\gamma=1.0$.
Figure 15E:
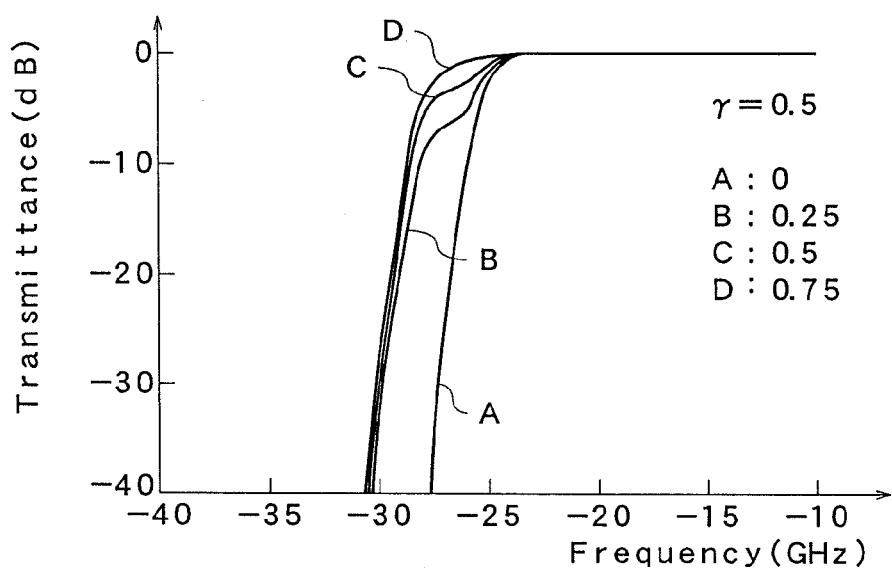
FIG. 15E is a graph showing relationship between change of the center frequency and transmittance in the case where the transmittance of a control pixel group is varied in the case of $\gamma=0.5$.
Figure 15F:
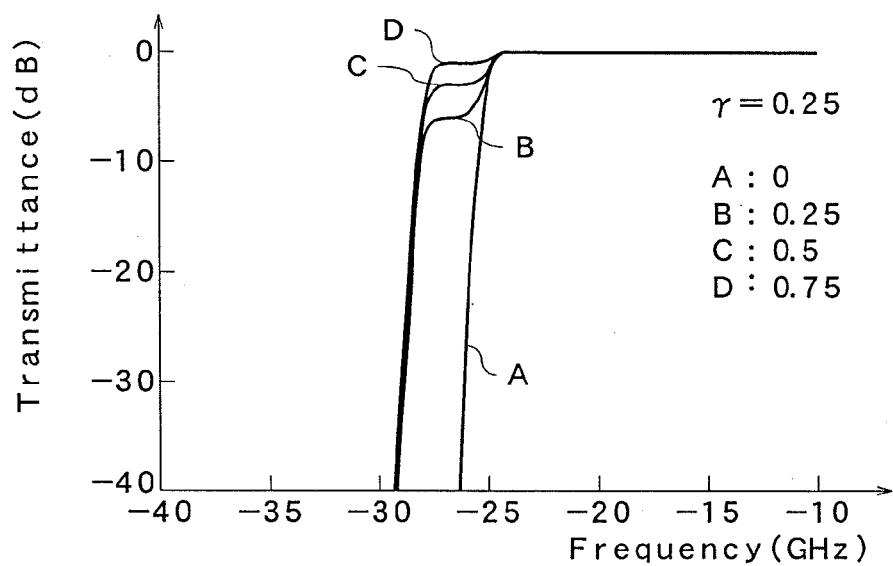
FIG. 15F is a graph showing relationship between change of the center frequency and transmittance in the case where the transmittance of a control pixel group is varied in the case of $\gamma=0.25$.

FIGS. 15A to 15F show relationship between the transmission frequency and transmittance in the case where the transmittance control pixel group on the low-frequency side is varied from 0 to 0.75 in units of 0.25 in order to change the bandwidth or decrease the center frequency under the above-mentioned conditions. FIG. 15A shows the case of $\gamma=2.7$, FIG. 15B shows the case of $\gamma=1.8$, FIG. 15C shows the case of $\gamma=1.2$, FIG. 15D shows the case of $\gamma=1.0$, FIG. 15E shows the case of $\gamma=0.5$, and FIG. 15F shows the case of $\gamma=0.25$. As apparent from these figures, in the case where $\gamma$ is equal to 1.0 or more, distortion of waveform does not occur. However, in the case where $\gamma$ is less than 1, that is, 0.5, 0.25 or the like, a transmittance response is reflected on the filter waveform, thereby generating distortion. For this reason, it is preferred that the pixel width d is equal to 1 or more, that is, the pixel width d is smaller than the input beam radius w.

Although incident light is WDM signal light in the first and second embodiments, the incident light is not limited to the WDM signal light. In other words, the present invention can be applied to various applications of filtering a desired light beam, for example, fields of tunable lasers and spectroscopic analysis.

As has been described in detail, according to the present invention, by changing reflection characteristics or transmission characteristic of the frequency selective element in units of pixel, the frequency selective characteristics of incident light can be changed. Thereby, the filter apparatus can be used as a main component of a node having an add-drop function of the WDM light or a component of spectroscopic apparatus.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2010-254648 filed on Nov. 15, 2010 is hereby incorporated by reference.

What is claimed is:

1. An optically variable filter apparatus comprising:
   an entrance/exit section which receives a light beam and allows exit a light beam of selected frequencies;
   a frequency dispersion element which spatially disperses the light beam incident on said entrance/exit section according to their frequencies and synthesizes reflected light beams;
   a light condensing element which condenses light beams dispersed by said frequency dispersion element as parallel light beams;
   a frequency selective element which has a plurality of pixels placed at positions at least in a frequency dispersion direction so as to receive light beams condensed by said light condensing element, and which changes reflection characteristics of each pixel to obtain desired frequency selective characteristics; and
   a frequency selective element driving unit which drives each pixel of said frequency selective element to gradation-control transmission characteristics according to frequencies of the incident light beam.

2. The optically variable filter apparatus according to claim 1, wherein said frequency selective element driving unit controls the pixels of said frequency selective element at least four gradations.

3. The optically variable filter apparatus according to claim 1, wherein a pixel width in the frequency dispersion direction in said frequency selective element is smaller than a beam radius of an incident light beam to said frequency selective element in the frequency dispersion direction.

4. The optically variable filter apparatus according to claim 1, wherein
   said frequency selective element is an LCOS element having a plurality of pixels arranged at least in a one-dimensional manner, and
   said frequency selective element driving unit controls a voltage applied to each pixel according to the frequency selective characteristics.

5. The optically variable filter apparatus according to claim 1, wherein
   said frequency selective element is a liquid crystal element having a plurality of pixels arranged at least in a one-dimensional manner, and
   said frequency selective element driving unit controls a voltage applied to each pixel according to the frequency selective characteristics.

6. The optically variable filter apparatus according to claim 1, wherein
   said frequency selective element is an MEMS element having a plurality of pixels arranged at least in a one-dimensional manner, and
   said frequency selective element driving unit controls a voltage applied to each pixel according to frequency selective characteristics.

7. An optically variable filter apparatus comprising:
   an entrance section which receives a light beam;
   a frequency dispersion element which spatially disperses the light beam received by said entrance section according to their frequencies;
   a first light condensing element which condenses light beams dispersed by said frequency dispersion element;
   a frequency selective element which has a plurality of pixels placed at positions at least in a frequency dispersion direction so as to receive light beams condensed by said light condensing element, and which changes transmission characteristics of each pixel to obtain desired frequency selective characteristics;
   a frequency selective element driving unit which drives each pixel of said frequency selective element to gradation-control optical transmission characteristics according to frequency of incident light beams;

a second light condensing element which condenses light beams passed through said frequency selective element;

a frequency synthesizing element which synthesizes the dispersed light beams condensed by said second light condensing element; and an exit section which allows exit the light beam synthesized by said frequency synthesizing element.

8. The optically variable filter apparatus according to claim 7, wherein said frequency selective element driving unit controls the pixels of said frequency selective element at least four gradations.

9. The optically variable filter apparatus according to claim 7, wherein a pixel width in the frequency dispersion direction in said frequency selective element is smaller than a beam radius of an incident light beam to said frequency selective element in the frequency dispersion direction.

10. The optically variable filter apparatus according to claim 7, wherein
said frequency selective element is an LCOS element having a plurality of pixels arranged at least in a one-dimensional manner, and
said frequency selective element driving unit controls a voltage applied to each pixel according to the frequency selective characteristics.

11. The optically variable filter apparatus according to claim 7, wherein
said frequency selective element is a liquid crystal element having a plurality of pixels arranged at least in a one-dimensional manner, and
said frequency selective element driving unit controls a voltage applied to each pixel according to the frequency selective characteristics.

12. A filter characteristic control method in an optically variable filter apparatus which has a frequency selective element having a plurality of pixels placed at positions at least in a frequency dispersion direction so as to receive light beams from a condensing element, the filter characteristic control method comprising the steps of:
upon setting a ratio of incident to emitted light beams emitted through pixel groups each composed of at least one pixel of said frequency selective element, the pixel corresponding to each frequency of the incident light beam, to transmittance of the pixel groups, bringing successive desired pixel groups into an optical transmissive state; and
gradually increasing transmittance of at least one first control pixel group adjacent to one end pixel group among pixel groups in a transmission frequency range and transmittance of at least one second control pixel group adjacent to the other end pixel group among the pixel groups in said transmission frequency range, thereby increasing a bandwidth.

13. A filter characteristic control method in an optically variable filter apparatus which has a frequency selective element having a plurality of pixels placed at positions at least in a frequency dispersion direction so as to receive light beams from a condensing element, the filter characteristic control method comprising the steps of:
upon setting a ratio of incident to emitted light beams emitted through pixel groups each composed of at least one pixel of said frequency selective element, the pixel corresponding to each frequency of the incident light beam, to transmittance of the pixel groups, bringing successive desired pixel groups into an optical transmissive state; and
gradually decreasing transmittance of at least one first control pixel group which is one end pixel group among pixel groups in a transmission frequency range and transmittance of at least one second control pixel group which is the other end pixel group among the pixel groups in said transmission frequency range, thereby decreasing a bandwidth.

14. A filter characteristic control method in an optically variable filter apparatus which has a frequency selective element having a plurality of pixels placed at positions at least in a frequency dispersion direction so as to receive light beams from a condensing element, the filter characteristic control method comprising the steps of:
upon setting a ratio of incident to emitted light beams emitted through pixel groups each composed of at least one pixel of said frequency selective element, the pixel corresponding to each frequency of the incident light beam, to transmittance of the pixel groups, bringing successive desired pixel groups into an optical transmissive state;
gradually increasing transmittance of at least one first control pixel group adjacent to one end pixel group among pixel groups in a frequency changing direction in a transmission frequency range; and
gradually decreasing transmittance of at least one second control pixel group which is the other end pixel group among the pixel groups in said transmission frequency range, thereby changing a center frequency in said transmission frequency range along a frequency axis.

* * * * *